United States Patent

Putnins et al.

[11] Patent Number: 5,825,779
[45] Date of Patent: Oct. 20, 1998

[54] PBX NETWORKING WITH QUALITY OF SERVICE CONTROL

[75] Inventors: Zigmunds Andis Putnins, Ridgewood, N.J.; Richard Koepper, Tomkins Cove, N.Y.; Adoor V. Balasubramania, Wayne, N.J.

[73] Assignee: Timeplex, Inc., Woodcliff lake, N.J.

[21] Appl. No.: 726,042

[22] Filed: Oct. 7, 1996

[51] Int. Cl.[6] .................................................... H04J 3/18
[52] U.S. Cl. ......................................... 370/477; 375/240
[58] Field of Search ..................................... 370/521, 528, 370/529, 477, 202; 375/240, 241; 348/384, 385, 386

[56] References Cited

U.S. PATENT DOCUMENTS

| | | | |
|---|---|---|---|
| 4,679,191 | 7/1987 | Nelson et al. | 370/84 |
| 4,771,425 | 9/1988 | Baran et al. | |
| 4,823,342 | 4/1989 | Morita et al. | |
| 4,825,434 | 4/1989 | Shaio | 370/80 |
| 4,890,282 | 12/1989 | Lambert et al. | |
| 5,031,211 | 7/1991 | Nagai | 379/221 |
| 5,042,027 | 8/1991 | Takase et al. | |
| 5,065,395 | 11/1991 | Shenoi et al. | 381/46 |
| 5,297,147 | 3/1994 | Shimokasu | 370/477 |
| 5,392,344 | 2/1995 | Ash et al. | 379/221 |
| 5,400,339 | 3/1995 | Sekine et al. | |
| 5,442,622 | 8/1995 | Hokari | |
| 5,455,855 | 10/1995 | Hokari | 379/229 |
| 5,467,348 | 11/1995 | Fujii et al. | |
| 5,469,502 | 11/1995 | Matsumoto | 379/230 |
| 5,526,350 | 6/1996 | Gittins et al. | 358/425 |
| 5,546,395 | 8/1996 | Sharma et al. | 375/246 |
| 5,553,079 | 9/1996 | Niki et al. | 370/477 |

*Primary Examiner*—Ajit Patel
*Attorney, Agent, or Firm*—Irwin Ostroff; Robert B. Ardis

[57] ABSTRACT

A networking node for interconnecting a local telephone switch such as a private branch exchange (PBX) with other such switches through other nodes, with respective internodal multichannel digital transmission links interconnecting the various nodes, provides service for both data and voice messages. The networking node provides at least two levels (one of which may be zero) of compression for voice messages and permits one of those levels to be preselected for all voice messages from the switch with which the node is associated to a predetermined one or more of the other nodes in the network. A look-up table is stored in memory within the node to control the assignment of particular levels of compression to particular destinations.

10 Claims, 2 Drawing Sheets

NETWORKING NODE 38                    100

| DESTINATION ADDRESS | CALL TYPE | SOURCE B-CHANNEL | COMPRESSION |
|---|---|---|---|
| PBX 36 | VOICE | ANY | LEVEL 2 |
| PBX 34 | VOICE | ANY | NONE |
| PBX 36 | VOICE | 23 | NONE |
| ANY | DATA | ANY | NONE |

102           104           106           108

NETWORKING NODE 38                    110

| DESTINATION ADDRESS | CALL TYPE | SOURCE B-CHANNEL | COMPRESSION |
|---|---|---|---|
| PBX 36 | VOICE | ANY | LEVEL 2 |
| PBX 34 | VOICE | ANY | LEVEL 1 |
| PBX 36 | VOICE | 23 | NONE |
| ANY | DATA | ANY | NONE |

112           114           116           118

PBX NETWORKING WITH QUALITY OF SERVICE CONTROL

FIELD OF THE INVENTION

This invention relates generally to voice and data communications networks and, more particularly, to multi-node voice and data communications networks making use of internodal multichannel digital transmission equipment.

BACKGROUND OF THE INVENTION

To satisfy modern telecommunications needs, switches such as private branch exchanges (PBXs) are often interconnected by multichannel digital transmission links which provide paths for both voice and data messages. Typically, such links take the form of serial digital transmission systems such as T1 facilities, which transmit 24 DS0 digital channels or time slots of 64 kilobits per second each, and E1 (the European equivalent) facilities which transmit 31 DS0 digital channels or time slots of 64 kilobits per second each.

A common arrangement has one time slot of each facility (designated as a "D-channel") carrying a predetermined messaging protocol and has the other channels (designated as "B-channels") carrying either pulse code modulation (PCM) coded voice or 64 kilobits per second data. In this arrangement, the D-channel is used to request that a connection be made through a particular B-channel. The D-channel indicates, in particular, the dialed or destination number, the B-channel in the transmission facility through which the connection is requested, and whether the requested B-channel is to carry voice or data.

In the past, the normal manner for interconnecting PBXs was to carry the D-channels from all PBXs (sometimes called "slaves") to a central PBX (sometimes called "master"). In addition, there would be an interconnection of an appropriate number of B-channels between the slave PBXs and the master PBX or directly between the slave PBXs. These interconnected B-channels formed "trunks," and the number of B-channels in a trunk would depend upon the expected amount of traffic between the two PBXs it linked.

The laws of trunking tell us that one large trunk is more efficient (meaning it can carry more calls with a given call blocking rate) than multiple smaller trunks. These laws suggest that all trunks from the slave PBXs should go to the master PBX to gain trunking efficiency. The disadvantage of such an arrangement is that any B-channel between two PBXs in close geographic proximity would have to be carried from the originating slave PBX to the master PBX and back to the destination slave PBX. The result is a cost burden on the user, who would need to supply (by purchase or lease) sufficient Wide Area Network (WAN) bandwidth between the master and the two slaves to carry this traffic. If the user chooses to provide a less costly and more direct route between the two geographically close PBXs, the user will have established two trunks, each of which is smaller than the original and therefore less efficient than the original.

A common way to interconnect B-channels carrying voice messages has been to pre-allocate an entire trunk for voice calls, and then optionally compress the B-channels to reduce the WAN bandwidth (and hence the WAN cost). Since the WAN cost is typically proportional to distance, the usual compression strategy has been to have no compression (and, as a result, little voice quality degradation) for connections that are geographically short, and heavier compression for connections that are geographically long. Use of such multiple trunk groups reduces the efficiency of the trunks, thus increasing the user's WAN cost for a given percentage of blocked calls. It does, however, have the desirable result of permitting use of multiple compression rates based on the WAN network cost. From another standpoint, support for multiple compression rates can be viewed as supporting multiple qualities of service.

SUMMARY OF THE INVENTION

This invention permits user-defined quality of service to be based upon call destination and call type (voice or data), while retaining the high efficiency of a single large trunk between a PBX and another PBX in a network as against the lesser efficiency of multiple smaller trunks. The advantage of the single larger trunk group is efficiency, which translates into reduced hardware costs through fewer trunks and fewer ports interfacing each PBX and the rest of the network.

From one important aspect, the invention takes the form of a networking node for connecting a local telephone switch to other remote telephone switches through similar networking nodes. In a network, a separate networking node is associated with each switch, and each node is connected with remote nodes through respective internodal transmission links, where each of the internodal transmission links is a serial digital multiplex transmission facility comprising a plurality of channels capable of carrying either voice or data messages.

From this aspect of the invention, the networking node comprises means for establishing at least two levels of compression in channels of the internodal transmission links, means for detecting the particular remote node and telephone switch to which a voice message originating through the local node or telephone switch is directed, and means for selecting a compression level for voice messages depending upon their destination. In other words, all voice messages directed to a predetermined remote node are assigned a predetermined compression level.

The networking node of the invention may, additionally, comprise means for selecting another predetermined compression level for voice messages directed to another predetermined one of the remote nodes. Data messages, regardless of destination, receive no compression at all.

From this aspect of the invention, one of the levels of compression in channels of the internodal links may be zero and different levels of compression may be selected for voice messages directed to different ones of the remote nodes or switches. Further, zero or any other specific level of compression may be selected for a predetermined one or more of the channels of an internodal transmission link regardless of voice message destination.

From another aspect of the invention, the networking node comprises means for establishing at least two levels of compression in channels of the internodal links, means for detecting which of the remote nodes a voice message originating through the local node is directed to, a table stored in memory identifying at least some of the remote nodes as destinations and designating a predetermined one of the compression levels for voice messages directed to a predetermined one of the remote nodes, and means responsive to the table for selecting the predetermined compression level for voice messages directed to the predetermined remote node. The table stored in memory may, in addition, designate another one of the compression levels for voice messages directed to another predetermined one of the remote nodes.

The networking node of the invention may, additionally, comprise means for selecting another predetermined one of the compression levels for voice messages directed to another predetermined one of the remote nodes. As before, data messages receive no compression at all regardless of destination.

From this latter aspect of the invention too, one of the levels of compression in channels of the internodal links designated in the table may be zero and different levels of compression may be preselected for voice messages directed to different ones of the remote nodes or switches. Further, zero or any other specific level of compression may be preselected in the table for a predetermined one or more of the channels of an internodal transmission link regardless of voice message destination.

The different levels of compression assigned to voice messages in accordance with the invention can be looked upon as different quality of service levels, since channels with heavy compression use fewer bits per byte of voice message service than those with light compression, and channels with light compression use fewer bits per byte of voice message service than those with no compression at all.

The invention may be more fully understood from the following detailed description of a specific embodiment, taken in the light of the accompanying drawing and the appended claims.

DETAILED DESCRIPTION

Figure 1:
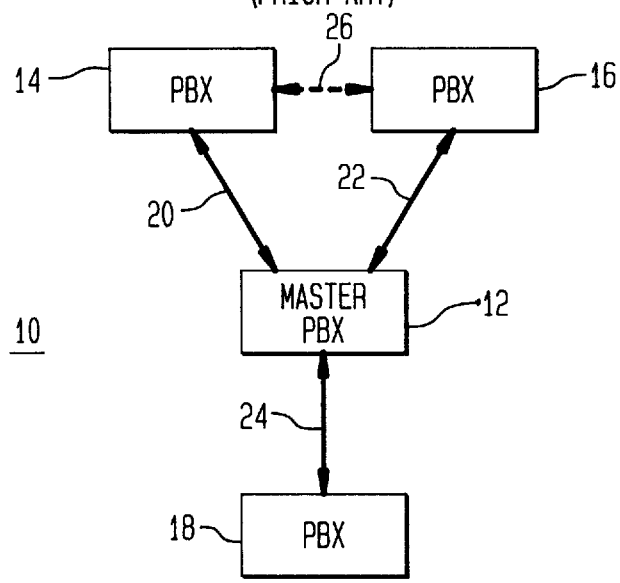
FIG. 1 is a block diagram showing a typical prior art arrangement for interconnecting multiple PBXs with digital internodal transmission links.

In FIG. 1, a network 10 of the type commonly found in the prior art comprises a master PBX 12 and three remote or slave PBXs 14, 16, and 18. There may be more slave PBXs, but three will serve adequately as an example. Connecting PBX 14 with master PBX 12 is a serial multichannel digital transmission link 20 which may take the form of one or more T1 (24 channel) or E1 (31 channel) systems each transmitting a plurality of digital channels consisting of time slots of 64 kilobits per second each. Transmission link 20 thus forms a trunk between PBX 14 and master PBX 12. Connecting PBXs 16 and 18 with master PBX 12 are similar multichannel digital transmission links 22 and 24. Transmission links 22 and 24 form trunks between master PBX 12 and slave PBXs 16 and 18, respectively.

In network 10, one time slot of each T1 or E1 system in transmission links 20, 22, and 24 is designated as a "D-channel" and carries messaging protocol. The remaining channels in each system are designated as "B-channels" and can carry either PCM coded voice messages or 64 kilobits per second data. In each link, the D-channel is used to designate the B-channel over which a message is to be transmitted, to indicate the dialed or destination number, and to indicate whether the message is to be voice or data.

Normally, all calls from slave PBX 14 to slave PBX 16 go first over transmission link 20 to master PBX 12 and over transmission link 22 to slave PBX 16. Such an arrangement provides maximum efficiency in that it can carry a maximum number of calls with a given call blocking rate. The disadvantage is that, if PBXs 14 and 16 happen to relatively close to one another geographically, calls between them are made to travel a greater geographical distance than would be necessary with a more direct connection. For a digital transmission link with a given bandwidth, distance is at least roughly proportional to cost. If the volume of calls between PBXs 14 and 16 is high enough to be significant, one less costly alternative is to provide a direct digital transmission link 26 between them and reduce some of the trunk capacity of transmission links 20 and 22 to and from master PBX 12.

Reducing the trunk capacity of links 20 and 22 has the disadvantage, however, of reducing their efficiencies in the sense of increasing their call blocking rates. Also, the greater the distance between PBXs 14 and 16, the greater will be the cost of direct transmission link 26 between them. If a portion of transmission link 26 can be pre-allocated for voice calls, it is possible to economize by compressing the B-channels to reduce bandwidth, thus permitting more calls to be transmitted over the transmission link than would otherwise be possible. Such a strategy becomes more attractive from a cost standpoint as the distance between PBXs 14 and 16 increases.

Figure 2:
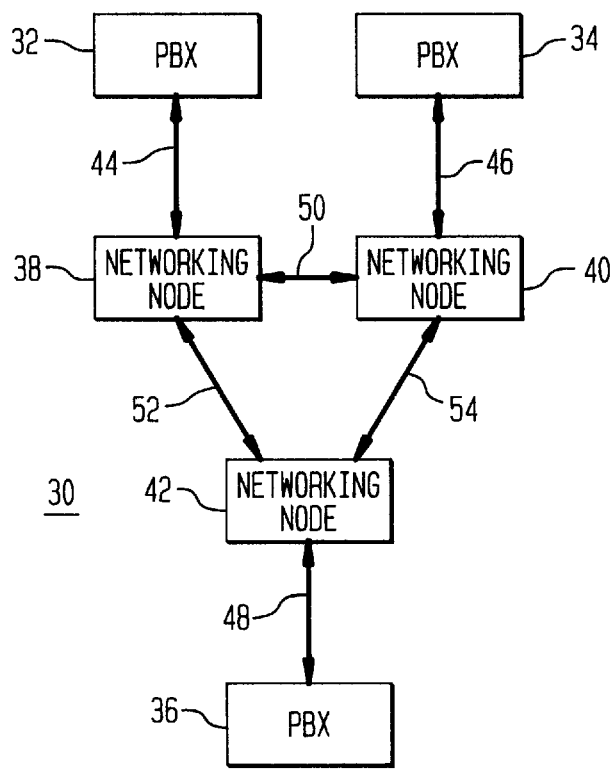
FIG. 2 is a block diagram showing how the present invention makes it possible for multiple PBXs to be interconnected with digital internodal transmission links.

The present invention affords a flexibility not available in the type of prior art network just described and the benefits of its application are illustrated in FIG. 2.

FIG. 2 illustrates a PBX network 30 in which the present invention permits a master PBX to be dispensed with. Again, three PBXs 32, 34, and 36 are illustrated, although more may be employed if desired or needed. Three networking nodes 38, 40, and 42 are provided, each embodying the invention. Each of networking nodes 38, 40, and 42 is associated with and is located in close geographic proximity to respective ones of PBXs 32, 34, and 36. Serial digital transmission links 44, 46, and 48 (such as T1 or E1 systems) are provided between PBX 32 and node 38, between PBX 34 and node 40, and between PBX 36 and node 42, respectively. A serial digital transmission link 50 (such as one or more T1 or E1 systems) interconnects nodes 38 and 40. A serial digital transmission link 52 (such as one or more T1 or E1 systems) interconnects nodes 38 and 42. Finally, a serial digital transmission link 54 (such as one or more T1 or E1 systems) interconnects nodes 40 and 42.

Figures 3, 4, 5:
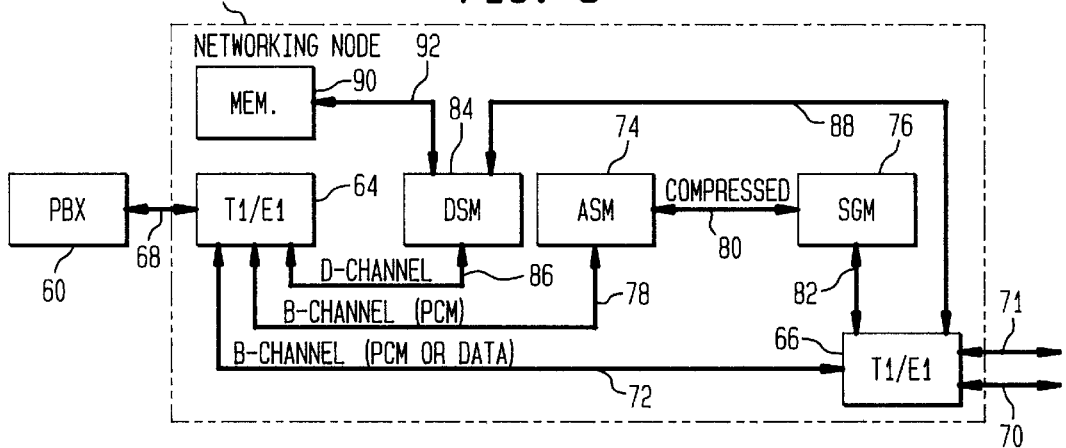
FIG. 3 is a block diagram a networking node embodying the invention.
FIGS. 4 and 5 illustrate specific examples of Quality of Service tables that may be used in the embodiment of the invention shown in FIG. 3.

FIG. 3 illustrates a PBX 60 connected to a networking node 62 which represents one specific embodiment of the invention. In FIG. 3, networking node 62 includes a first T1/E1 (T1 or E1, depending upon whether T1 or E1 digital transmission links are employed) module 64 and a second T1/E1 module 66. A first T1 or E1 transmission link 68 connects PBX 60 to first T1/E1 module 64, and a pair of T1 or E1 transmission links 70 and 71 connect second T1/E1 module 66 to the rest of the network. By way of example, PBX 60 corresponds to PBX 32 in FIG. 2, transmission link 70 corresponds to transmission link 44 in FIG. 2, and transmission links 70 and 71 correspond to transmission links 50 and 52 in FIG. 2.

For voice or data messages originating with PBX 60, first programmable T1/E1 module 64 separates the channels for transmission over an internal B-channel (PCM or data) connecting link 72 to second programmable T1/E1 module 66. T1/E1 module 64 is programmed to select one channel (referred to as the D-channel) to carry a messaging protocol. The messaging protocol requests that, for a particular message, a connection be established through a particular B-channel. The messaging protocol also indicates the dialed or destination number, and indicates whether the requested B-channel is to carry voice or data. T1/E1 module 64 additionally controls connection of the remaining channels, all of which are B-channels, to carry the actual voice and data messages.

Other components of networking node 62 include an application server module (ASM) 74 and a subrate groomer module (SGM) 76. ASM 74 is pre-programmed, in one direction, to provide specific levels of voice compression, such as level 1, level 2, or no compression at all. By way of example, "no compression" uses the normal number of bits per byte for voice transmission, level 1 uses fewer than the normal number, and level 2 uses even less. Savings take place when levels 1 or 2 are used, because the remaining bits in each byte become free for use by other compressed (hence called "sub-rate") voice messages. SGM 76 is pre-programmed to perform the sub-rate multiplexing and demultiplexing. In the other direction of transmission, ASM 74 is pre-programmed to expand received voice messages to "normal" bandwidth. As illustrated, an internal B-channel (PCM coded voice) connecting link 78 couples T1/E1 module 64 with ASM 74, an internal compressed voice connecting link 80 couples ASM 74 with SGM 76, and an internal compressed voice connecting link 82 couples SGM 76 with T1/E1 module 66.

A D-channel server module (DSM) 84 is pre-programmed to provide the necessary signaling (i.e., to indicate the dialed or destination number, the B-channel for which a connection to carry a particular message is to be established, and whether the B-channel for which connection is requested will carry voice or data). A D-channel internal connecting link 86 couples T1/E1 module 64 with DSM 84, and another internal connecting link 88 couples DSM 84 with T1/E1 module 66. A memory unit 90, coupled to DSM 84 through an internal connecting link 92, is pre-programmed to provide look-up tables providing instructions, in accordance with the invention, for controlling the amount of compression (which can be termed "Quality of Service," since quality of service increases as the amount of compression is decreased) for selected voice messages.

T1/E1 modules 64 and 66 follow conventional design practice and make physical connections between PBX 60 over T1 or E1 facilities. They provide a framing function to identify the B-channels coming from and going to PBX 60 and pass data and voice messages in the B-channels to the other modules within networking node 62 for processing. ASM module 74, SGM module 76, and DSM module 84 also follow conventional design practice. ASM module 74 performs voice compression and transcoding between PCM samples in the B-channels and the compressed voice bit stream. SGM module 76 multiplexes multiple compressed voice channels onto the outgoing bit stream, thus reducing the amount of WAN bandwidth needed to support that number of voice channels. Finally, DSM module 84 processes the D-channel messages and converts them to call requests for networking node 62. For ASM module 74, specific examples of voice compression algorithms well known in the art include the following International Telecommunications Union standards: (1) ITU G.728—Low Delay Code Excited Linear Prediction, (2) ITU G.729— Conjugate Structure Algebraic Code Excited Linear Prediction (CS_CELP), and ITU G.726—Adaptive Differential Pulse Code Modulation (ADPCM).

FIG. 4 illustrates an example of a "Quality of Service" look-up table 100 that may be used in memory module 90 in networking node 38 in network 30 in FIG. 2. Look-up table 100 has four columns 102, 104, 106, and 108. Column 102 lists destination addresses, column 104 lists call types, column 106 lists the B-channel selected (i.e., the source B-channel), and column 108 specifies the amount of compression. Thus, the first row of table 100 ensures that, from networking node 38, voice calls destined for PBX 36 receive level 2 or "heavy" compression, regardless of the B-channels selected for their transmission. The second row of table 100 ensures that, from networking node 38, voice destined for PBX 34 calls for PBX 34 receive no compression, regardless of the B-channels selected for their transmission. The third row of table 100 ensures that, from networking node 38, voice calls destined for PBX 36 but specifically assigned to B-channel 23 receive no compression. This third line in table 100 provides a "hotline" function, in which certain B-channels (in this instance, 23) can be assigned special service (in this instance, high quality voice), thus overriding the more general instruction contained in the first row of table 100. Finally, the fourth line in table 100 ensures that, from networking node 38, all data calls receive no compression at all, regardless of destination.

To duplicate the functionality of the first two rows in table 100 using conventional multiplexors of the type shown in FIG. 1, at least two trunk groups would have to be assigned to connect PBX 14 to PBX 16, one for high quality voice calls to PBX 16 and the other for level 2 or "heavy" compressed voice calls to PBX 16. Such an arrangement would either reduce the efficiency of the trunk groups or require an increase in hardware to support the same level of call blocking.

FIG. 5 gives an example of another "Quality of Service" look-up table 110 that may be used in memory module 90 in networking node 38 in network 30 in FIG. 2. Look-up table 110 also has four columns 112, 114, 116, and 118. Column 112 lists destination addresses, column 114 lists call types, column 116 lists the B-channel selected (i.e., the source B-channel), and column 118 specifies the amount of compression. Thus, the first row of table 110 ensures that, from networking node 38, voice calls destined for PBX 36 receive level 2 or "heavy" compression, regardless of the B-channels selected for their transmission. The second row of table 110 ensures that, from networking node 38, voice destined for PBX 34 calls for PBX 34 receive level 1 or "light" compression, regardless of the B-channels selected for their transmission. The third row of table 110 ensures that, from networking node 38, voice calls destined for PBX 36 but specifically assigned to B-channel 23 receive no compression. As in table 100 in FIG. 4, this third line in table 110 provides a "hotline" function, in which certain B-channels (in this instance, 23) can be assigned special service (in this instance, high quality voice), thus overriding the more general instruction contained in the first row of table 110. Finally, the fourth line in table 110 ensures that, from networking node 38, all data calls receive no compression at all, regardless of destination.

It is to be understood that the embodiments of the invention which have been described are illustrative. Numerous other arrangements and modifications may be readily devised by those skilled in the art without departing from the spirit and scope of the invention.

We claim:

1. A networking node for connecting a local telephone switch to at least two remote nodes through respective internodal transmission links, where each of said internodal transmission links is a serial digital multiplex transmission facility comprising a plurality of channels capable of carrying either voice or data messages, said networking node comprising:

means for establishing at least two levels of compression in channels of said internodal transmission links;

means for detecting which of said remote nodes is the destination node for each voice message originating through said local telephone switch; and means for selecting a predetermined one of said compression levels for voice messages directed to a predetermined one of said remote nodes as destination node, where selection is based upon the identity of said predetermined one of said remote nodes.

2. The networking node of claim 1 further comprising means for selecting another predetermined one of said compression levels for voice messages directed to another predetermined one of said remote nodes as destination node.

3. The networking node of claim 1 in which one of said levels of compression is zero and in which a predetermined one of said compression levels which is not zero is selected for voice messages directed to said predetermined one of said remote nodes as destination node.

4. The networking node of claim 3 further comprising means for selecting another predetermined non-zero one of said compression levels for voice messages directed to another predetermined one of said remote nodes as destination node.

5. The networking node of claim 3 further comprising means for selecting zero compression level for voice messages over a predetermined one of the channels of one of said internodal links regardless of voice message destination.

6. A networking node for connecting a local telephone switch to at least two remote nodes through respective internodal transmission links, where each of said internodal transmission links is a serial digital multiplex transmission facility comprising a plurality of channels capable of carrying either voice or data messages, said networking node comprising:

means for establishing at least two levels of compression in channels of said internodal transmission links;

means for detecting which of said remote nodes is the destination node for each voice message originating through said local telephone switch;

a table stored in memory listing at least some of said remote nodes and designating a predetermined one of said compression levels for voice messages directed to a predetermined one of said remote nodes as destination node; and means responsive to said table for selecting said predetermined one of said compression levels for voice messages directed to said predetermined one of said remote nodes as destination node, where selection is based upon the identity of said predetermined one of said remote nodes.

7. The networking node of claim 6 in which said table stored in memory designates another predetermined one of said compression levels for voice messages directed to another predetermined one of said remote nodes as destination node, said network node further comprising means for selecting another predetermined one of said compression levels for voice messages directed to another predetermined one of said remote nodes as destination node.

8. The networking node of claim 6 in which one of said levels of compression is zero and in which a predetermined one of said compression levels which is not zero is selected for voice messages directed to said predetermined one of said remote nodes as destination node.

9. The networking node of claim 8 in which said table stored in memory designates another predetermined non-zero one of said compression levels for voice messages directed to another predetermined one of said remote nodes as destination node, said networking node further comprising means for selecting said other predetermined one of said compression levels for voice messages directed to another predetermined one of said remote nodes as destination node.

10. The networking node of claim 8 in which said table designates zero compression level for voice messages over a predetermined one of the channels of one of said internodal links regardless of destination, said networking node further comprising means for selecting zero compression level for voice messages over said predetermined one of said channels regardless of voice message destination.

* * * * *